Dec. 4, 1951  J. W. WHITE, JR  2,577,553
AUTOMATIC FISHING REEL
Filed July 27, 1948
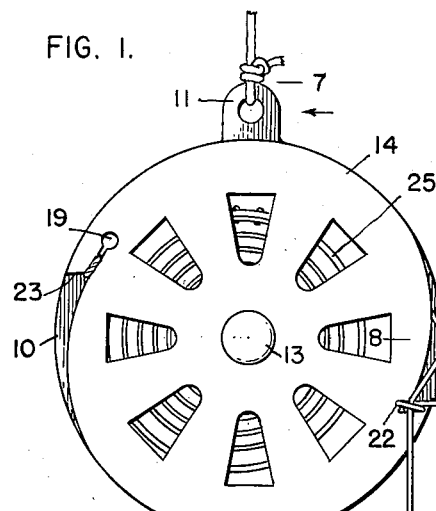
FIG. 1.
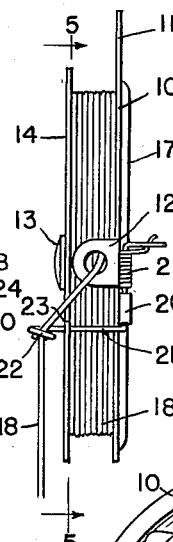
FIG. 2.
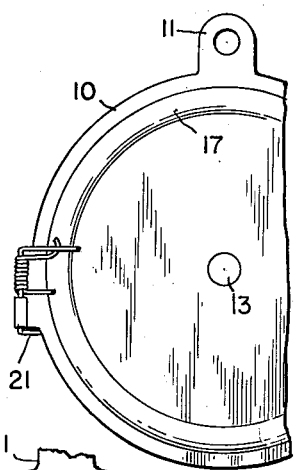
FIG. 3.
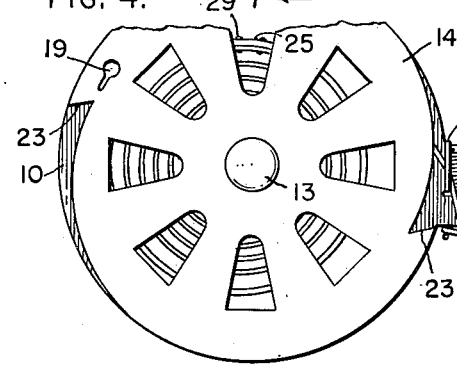
FIG. 4.
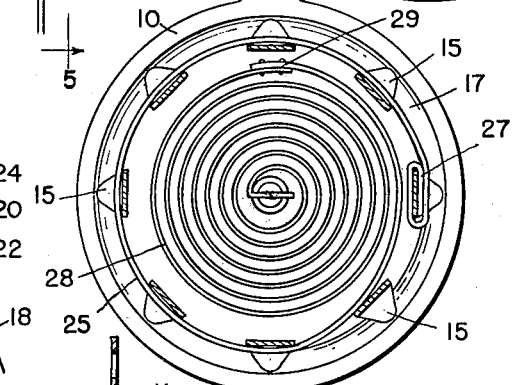
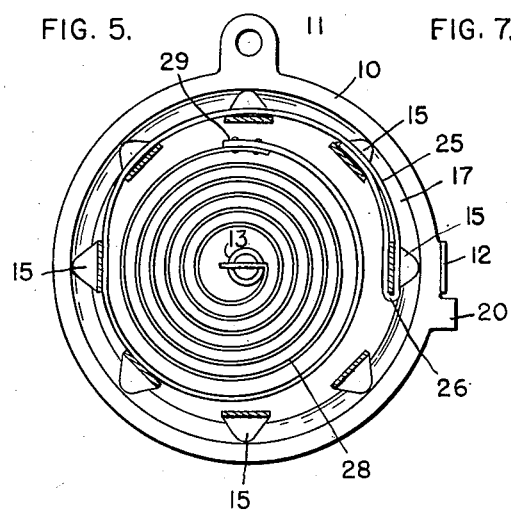
FIG. 5.
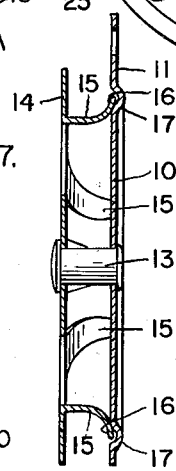
FIG. 7.
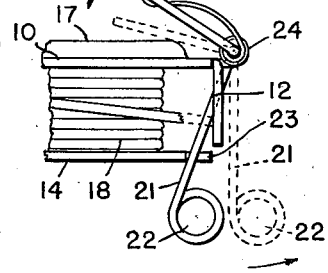
FIG. 6.
FIG. 8.
Inventor
JOHN W. WHITE, JR.
Cushman, Darby & Cushman
Attorneys Patented Dec. 4, 1951

2,577,553

UNITED STATES PATENT OFFICE 2,577,553

AUTOMATIC FISHING REEL

John W. White, Jr., Little Rock, Ark.

Application July 27, 1948, Serial No. 40,925

10 Claims. (Cl. 242—109)

This invention has to do with automatic fishing reels, namely, that type, which, when a fish is hooked, a spring actuated reel will be released and the catch brought in. With such reels, the line may be reeled off; the bait or lure cast; the spring put under tension; the reel latched in its position of adjustment, and the equipment suspended from a suitable support. When the catch is made, the latched reel will be automatically released, and the spring will rotate the reel to pull in the line and catch. Such equipment relieves the fisherman from the need of constant watching of the float and manual reeling in of the catch, as the action is entirely automatic after the cast is made, the reel parts set, and the fish is hooked. Several such reels may be set and conveniently attended by one fisherman.

The broad idea of automatic reels is old, but the reel herein disclosed has structural features which distinguish it from other types and combine to make a simple, easily manufactured, efficient, and low priced construction.

Briefly stated, the reel comprises a hanger plate by which it may be suspended, such plate having an arbor. On the arbor of the hanger plate is rotatably mounted a reel plate having line guides on which the line is wound, providing a reel with an open, unobstructed edge from which the line may be freely unwound and wound. A line engageable spring latch is mounted on the hanger plate to hold the reel in various positions of adjustment, this latch being releasable under the pull of a hooked fish on the line, to permit the tensioned spring to rotate the reel and pull in the catch. The latch is spring actuated and so designed that it is constantly urged to reel latching position, thus preventing the reel retracting spring from exerting a continuous reeling in action when once released by line pull on the latch. When a strike is made, it not infrequently happens that the catch will slacken the line. When this happens, the spring retracted reel, freed of the latch, would effect a complete reeling in action which is undesirable. With the spring latch of the present construction, any line slackening will at once result in the latch arresting the reel and the action of the spring and hold them until again released by line pull, thus conserving spring action over a considerable period. Of course, if there is continuous pull on the line after the strike so as to hold the latch disengaged from the reel, continuous and complete reeling in of the catch will occur.

In the drawings herewith, forming part of this disclosure, one physical embodiment of the invention is shown. This disclosure is illustrative, but in no sense restrictive insofar as mechanical variations are concerned.

In the drawings:

Figure 1 is a view in side elevation, from the reel plate side of the reel showing the latch in reel holding position.

Figure 2 is an edge view of the reel showing the spring latch in elevation and its relation to the reel and line.

Figure 3 is a view in side elevation of a portion of the hanger plate showing the spring latch mounted on the plate.

Figure 4 is a view in side elevation, showing the latch in reel releasing position under pull in the line.

Figure 5 is a view substantially on the line 5—5 of Fig. 2, of the hanger plate, the retracting spring, and the line guides.

Figure 6 is a view similar to Fig. 5 showing a slightly different spring arrangement.

Figure 7 is a sectional view, on substantially the line 7—7 of Fig. 1, showing the hangar plate and reel plate with line guides, the retracting spring and reel latch being omitted.

Figure 8 is an enlarged detail view of the spring latch.

The drawings are referred to by numbers in describing the invention, the same numbers designating the same parts in the several views. A hanger plate 10 is provided, having a suspending lug 11 and a line loop 12 through which the line passes. Mounted on hanger plate 10 is an arbor 13 on which is rotatably mounted a peripherally open reel plate 14 having a plurality of line guides 15 preferably, as here shown, struck up from reel plate 14 and projecting across to the hanger plate 10 with their upturned ends housed within a groove 17 formed in the hanger plate 10. This construction in which the line guides 15 are struck from reel plate 14 gives a compact, conveniently formed, and economical reel plate which may be readily made and assembled with the hanger plate and its arbor 13. The open periphery of the reel not only lends itself to manipulation of the line but also exposes the line throughout the entire periphery of the reel so that a wet line will dry readily. This drying out of the line is further aided by reason of the openings formed in the reel plate when the line guides 15 are struck out of it, such openings permitting access of air to the wound up line and also allowing the escape of sand or other debris frequently picked up by the line. The arbor 13 is headed, as shown, to retain the plate in assembled relation. Housing of the ends 16 of line guide 15 in the groove 17 in hanger plate 10 guards against entanglement of the line with the line guides or other parts of the reel.

The reel plate 14 will be provided with any suitable means for attaching the line 18, here shown as a keyhole slot 19 at the edge of the reel plate. From this anchorage 19 the line 18 is wound on the line guides 15 of the reel plate 14 with its casting end carrying the hook, sinker, and float (not shown) set in the usual positions ready for casting. Line 18 passes through loop 12 on hanger plate 10, which loop extends inwardly across the reel plate 14 in proper position always to guide the line 18 in its withdrawal from or return to the reel.

Pivotally mounted at 20 on hanger plate 10 is a latch having a limb 21 extending laterally across the reel and provided with a line receiving loop 22. The limb 21, in normal position, rides the edge of reel plate 14 in such relation thereto as to engage reel stops 23, here shown as notches in the reel plate edge. Two stops 23 are here shown, but the number may be varied as desired. A spring 24 on the shank or the latch tends always to return the latch to reel stop engaging position. When the bait is taken, the run of the fish will pull line 18 through fixed loop 12 and latch loop 22, throwing the latch to reel releasing position and allowing the reel to rotate and pay out the line against the action of the reel retracting spring, presently to be described. On slackening of the line, the latch spring 24 will at once return the latch to reel holding position by engaging latch arm 21 with a stop 23 on reel plate 14. This arrangement of the latch mounted on the hanger plate and extending laterally across the reel and riding the edge of the reel plate ensures releasing of the reel when the line 18 is pulled, and stopping of the reel on slackening of the line, by return of the latch to latching position under the influence of the spring 24.

In order to effect automatic reeling in of the line, a reel plate retracting spring is provided having its inner end secured to the arbor 13 on hanger plate 10 and its outer end secured to reel plate 14. Preferably, this retracting spring will be made up of sections of different strengths. Outer spring section 25 will be heavier than the inner section and secured in any suitable manner to the reel plate 14. In Fig. 5 a folded back loop 26 is shown engaging a line guide 15. In Fig. 6 a closed loop 27 is engaged with a line guide 15. The inner section 28 of the retracting spring is of lesser strength than the outer section 25, to which it is suitably secured at 29, as by bradding, so as to provide a continuous spring of unequally tensioned sections. The action of the spring and pull on the line will be initially stronger, so that when a strike is made setting of the hook in the mouth of the fish and high resistance to the first run of the catch ensured. A continued run will bring the inner and weaker section of the spring into action, so that resistance on the line will be continued.

The reel of this disclosure presents a construction in which the number of parts are few, the assemblage of those parts simple and easy without the need of skilled labor, resulting in a peripherally open, easily manipulable reel which, by reason of its open periphery and the radial openings in the reel plate, will effect rapid drying of the line, and one which is entirely automatic both in its reeling in action and also in stoppage of such action under usual fishing operations. It will be seen that the line can be pulled off in any length for casting without interference from supports, guides, or the like. The unwinding of the line will increase the tension of the spring dependent on the length of the line unwound, and winding in of the line will decrease the tension of the spring. This permits proper adjustments for fishing in different depths and tensioning of the spring may also be adjusted to the type of fish being angled for. With heavy or strong striking fish a high spring tension may be set, while for smaller or less active fish a decreased spring tension may be provided for.

Such departures from this illustrative disclosure as involve only mechanical skill and fall within the terms of the appended definitive claims are to be regarded as within the range of the invention.

I claim:

1. An automatic fishing reel comprising a hanger plate having a line guide receiving groove, an arbor carried by said hanger plate, an open reel plate having latch-engageable stops rotatably mounted on said arbor, line guides on said reel plate the outer ends of which engage the groove in said hanger plate, a reel plate retracting spring secured at its inner end to said arbor and at its outer end to said reel plate, a reel plate latch releasable by pull on the line pivoted on said hanger plate to engage the reel plate stops and hold said reel plate in adjusted positions, and a spring tending to return said latch always to reel holding position.

2. An automatic fishing reel comprising a hanger plate having a line guide receiving groove, an arbor carried by said hanger plate, an open reel plate having latch-engageable stops rotatably mounted on said arbor, line guides struck from said reel plate with their ends engaging the groove in said hanger plate, a reel plate retracting spring secured at its inner end to said arbor and at its outer end to said reel plate, a reel plate latch releasable by pull on the line pivoted on said hanger plate to engage the reel plate stops and hold said reel plate in adjusted positions, and a spring tending to return said latch always to reel holding position.

3. An automatic fishing reel comprising a hanger plate, an arbor carried by said hanger plate, an open reel plate having latch-engageable stops at its periphery and rotatably mounted on said arbor independently of said hanger plate, line guides struck from said reel plate, a reel plate retracting spring secured at its inner end to said arbor and at its outer end to said reel plate, a reel plate latch pivoted on said hanger plate, an arm of said latch extending transversely across said hanger plate and reel in reel plate stop engaging position, and a spiral spring on the shank of said latch to always urge the latch to reel stop engaging position.

4. An automatic fishing reel comprising a hanger plate, an arbor carried by said hanger plate, a peripherally open reel plate mounted on said arbor, line guides on said reel plate, latch-engageable stops on said reel plate, a reel plate retracting spring secured at its inner end to said arbor and at its outer end to said reel plate, a reel plate latch pivotally mounted on said hanger plate and extending transversely across the periphery of said reel to engage said reel plate stops and releasable by pull on the line to disengage the latch stops, and a spring tending to return said latch arm to reel plate holding position.

5. An automatic fishing reel comprising a hanger plate, an arbor carried by said hanger plate, a peripherally open reel plate mounted on said arbor, line guides struck inwardly from said reel plate and providing openings to permit access of air to the wound up line, latch-engageable stops on said reel plate, a reel plate retracting spring secured at its inner end to said arbor and at its outer end to said reel plate, a reel plate latch pivotally mounted on said hanger plate and extending transversely across the periphery of said reel to engage said reel plate stops and releasable by pull on the line to disengage the latch stops, and a spring secured to the pivot end of said latch tending to return said latch arm to reel plate holding position.

6. An automatic fishing reel comprising a hanger plate, an arbor carried by said hanger plate, a peripherally open reel plate mounted on said arbor, line guides struck inwardly from said reel plate and providing radially disposed openings to permit access of air to the wound up line, latch engageable stops on the outer periphery of said reel plate and integral therewith, a reel plate retracting spring secured at its inner end to said arbor and at its outer end to said reel plate, a reel plate latch pivotally mounted on said hanger plate and extending transversely across the periphery of said reel to engage said latch stops and releasable by pull on the line to disengage the latch stops, and a spring tending to return said latch arm to reel plate holding position.

7. An automatic fishing reel comprising a hanger plate, an arbor carried by said hanger plate, a peripherally open reel plate mounted on said arbor, line guides on said reel plate, latch engageable stops on the outer periphery of said reel plate, a reel plate retracting spring having heavy and light sections and secured at its inner end to said arbor and at its outer end to said reel plate for handling larger fish, a reel plate latch pivotally mounted on said hanger plate and extending transversely across the periphery of said reel to engage said latch stops and releasable by pull on the line to disengage the latch stops, and a spring tending to return said latch arm to reel plate holding position.

8. A fishing reel comprising a hanger plate, and a peripherally open reel plate rotatably mounted relative to said hanger plate, said reel plate having openings in its wall to permit access of air to the wound up line, a reel plate latch pivotally mounted on said hanger plate and extending transversely across the channel of said reel plate to engage stops integral with the periphery of said reel plate.

9. A fishing reel comprising a hanger plate, and a peripherally open reel plate rotatably mounted relative to said hanger plate, said reel plate having radial openings in its wall to permit escape of sand or other debris from and access of air to the wound up line, a reel plate latch pivotally mounted on said hanger plate and extending transversely across the channel of said reel plate to engage stops integral with the periphery of said reel plate.

10. A fishing reel comprising a hanger plate, and a fixed arbor on said hanger plate, and a peripherally open reel plate rotatably mounted on said fixed arbor relative to said hanger plate, said reel plate having radial openings in its wall to permit escape of sand or other debris from and access of air to the wound up line, a reel plate latch pivotally mounted on said hanger plate and extending transversely across the channel of said reel plate to engage stops integral with the periphery of said reel plate.

JOHN W. WHITE, Jr.

REFERENCES CITED

The following references are of record in the file of this patent:

UNITED STATES PATENTS

| Number | Name | Date |
|---|---|---|
| 238,061 | Shehan | Feb. 22, 1881 |
| 316,965 | Hay | May 5, 1885 |
| 552,243 | Feeney et al. | Dec. 31, 1895 |
| 742,260 | Van Alstyne | Oct. 27, 1903 |
| 1,138,738 | Earll | May 11, 1915 |
| 1,265,038 | Bieman | May 7, 1918 |
| 1,643,725 | Price | Sept. 27, 1927 |
| 2,249,114 | Coffman | July 15, 1941 |
| 2,303,668 | Tilbury | Dec. 1, 1942 |

FOREIGN PATENTS

| Number | Country | Date |
|---|---|---|
| 4,279 | Great Britain | Mar. 26, 1886 |
| 388,595 | France | June 4, 1908 |